United States Patent [19]

Vicard

[11] Patent Number: 5,039,498
[45] Date of Patent: Aug. 13, 1991

[54] PROCESSES FOR THE PURIFICATION OF FLUE GASES

[75] Inventor: Jean-François Vicard, Lyon, France

[73] Assignee: Societe Lab- Tour du Credit Lyonnais, Lyon, France

[21] Appl. No.: 468,931

[22] Filed: Jan. 23, 1990

[30] Foreign Application Priority Data

Feb. 1, 1989 [FR] France ............................. 89 01503

[51] Int. Cl.$^5$ ............................................. B01D 53/00
[52] U.S. Cl. ........................................ 423/240; 55/71; 55/73; 55/89
[58] Field of Search ................... 55/73, 89, 68, 71; 423/240

[56] References Cited

U.S. PATENT DOCUMENTS

| 3,370,402 | 2/1968 | Nakai et al. | 55/94 |
| 4,047,891 | 9/1977 | Schuetz | 55/89 X |
| 4,325,713 | 4/1982 | Rosenberg et al. | 55/73 |
| 4,617,180 | 10/1986 | Vogg | 423/240 |
| 4,753,663 | 6/1988 | Neefus et al. | 55/89 |
| 4,765,805 | 8/1988 | Wahl et al. | 55/89 X |
| 4,854,946 | 8/1989 | Heijwegen et al. | 55/89 X |

*Primary Examiner*—Charles Hart
*Attorney, Agent, or Firm*—Dowell & Dowell

[57] ABSTRACT

A process for the purification of flue gases by wet methods in which the inert part of the flue gases are separated from acidic pollutants by leaching with the acidic agents of the washing liquid to which recovered flue dust has been added. The leached toxic pollutants are then extracted from the washing liquid by appropriate treatment of the discharge of the recycling circuit.

5 Claims, 1 Drawing Sheet

PROCESSES FOR THE PURIFICATION OF FLUE GASES

BACKGROUND OF THE INVENTION

1. Field of the Invention

This invention relates to processes for the purification of flue gases by wet methods.

2. History of the Related Art

According to these processes, a washing liquid is brought into contact with the flue gases to be purified in a scrubber. The dust in the gases is transferred to the washing liquid and, at the same time, the gaseous pollutants are absorbed by the washing liquid according to their solubility and the characteristics of this washing liquid. As a large quantity of washing liquid is generally required for the purification of flue gases, the washing liquid is recycled in the scrubber and the pollutants collected are extracted from the scrubber/recycling circuit assembly by means of the smallest possible liquid discharge.

E.g. in the case of refuse incinerating plants, refuse is destroyed and replaced by clinker. The flue gases produced carry the recovered energy and pollutants in particulate and gaseous form, the most common being HCl, HF, SO$_2$ and the heavy metals in particulate or gaseous form. Once collected, these pollutants must follow one of two routes—reutilization or disposal. A large number of processes have been proposed to condition the residue in order to facilitate disposal or reutilization as building material. The disadvantage of these processes is the necessity to treat large quantities, mixing a small proportion of toxic elements and a large proportion of inert elements.

In this respect, it is advantageous to separate the toxic elements such as the heavy metals from the inert elements prior to specific treatment.

Various processes have been proposed to this end. These usually comprise separation of the dust (or flue dust) in an electrostatic precipitator followed by gas absorption in a scrubber. The liquid discharge of this scrubber is acidic and is used in a separate installation for leaching the flue dust collected in the electrostatic precipitator. It is possible in this manner to produce solid residue leached in the acid phase and a liquid effluent containing heavy metals which are then precipitated into a conventional water treatment plant or extracted selectively for recovery.

The aim of this invention is to eliminate the addition of another complex installation and to make efficient use of the capacity of the scrubber, which, as indicated hereinabove, is of necessity provided with a large recycling circuit for the washing liquid in order to guarantee purification of flue gases. Surprisingly, moreover, experience has shown that leaching effected in a high-capacity recycling circuit of this kind is much easier to control with a view to the acid leaching of the flue dust.

DESCRIPTION OF THE PREFERRED EMBODIMENT

Figure 1:
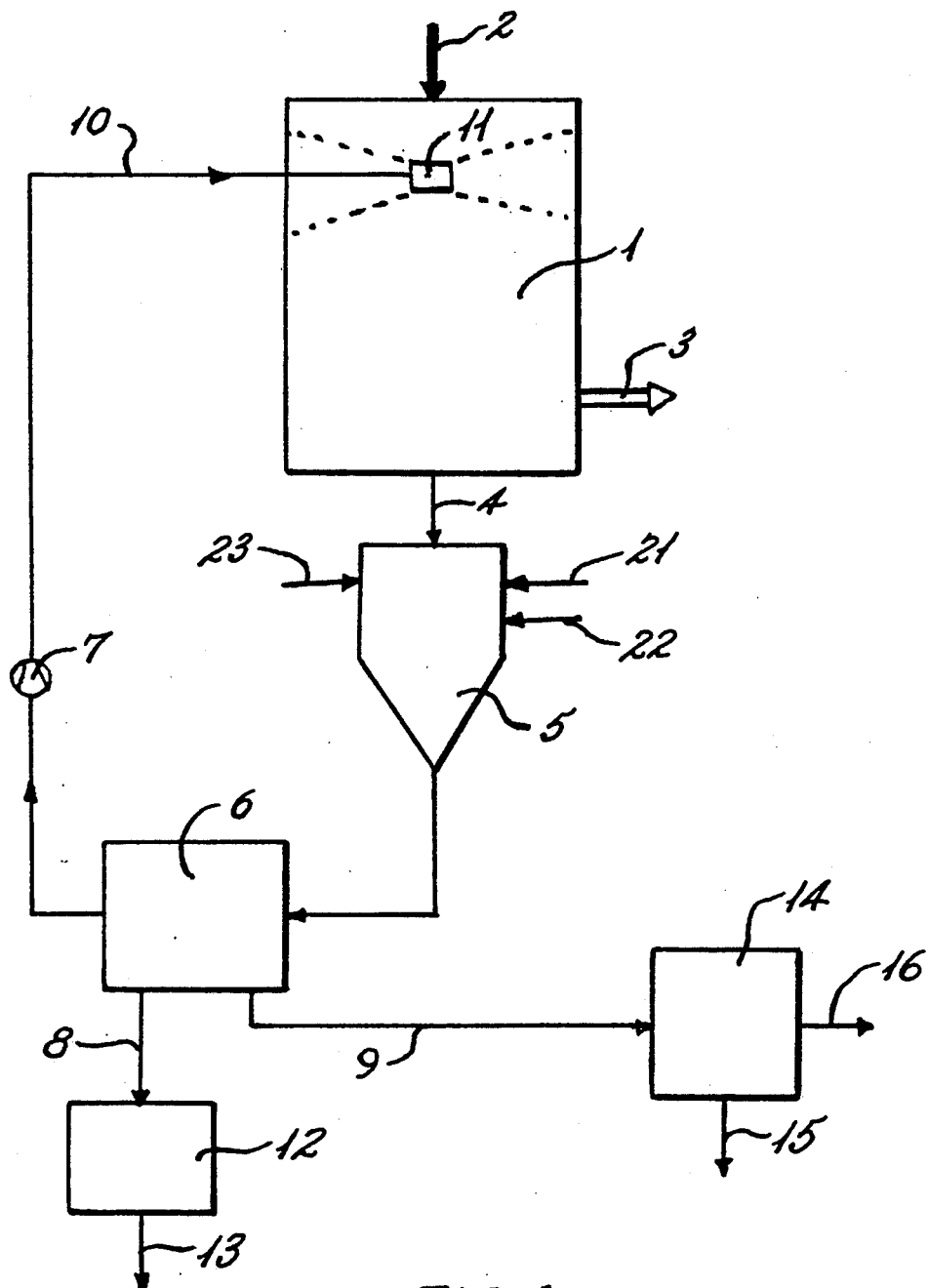
FIG. 1 is a schematic flow diagram of a process in accordance with the present invention.

According to the invention, the flue gases (2) to be purified enter the scrubber (1) or are contacted by the recycled washing liquid (10) distributed in the gases by the appropriate device (11). They emerge from the scrubber in a purified state (3). After contact with the gases, the washing liquid (10) introduced into the scrubber (1) is recovered (4) in a tank (5) which can be provided in the base of the scrubber (1). An acidic agent (21) can be added to this tank if the flue gases do not provide a sufficient quantity of acid for the acid leaching. Similarly, a neutralizing agent (22) is added in order to keep the pH of the washing liquid in the acid zone.

This addition is not necessary if the collected flue dust itself provides sufficient alkalinity. Finally, it is also possible to inject as shown at (23) into this tank (5) the flue dust collected above or upstream the scrubber (1). Devices are provided for recovering the dust above or upstream of the scrubber and the dust is introduced into the washing liquid emerging from the scrubber before the washing liquid passes into a separating apparatus. A device (6) is added to the recycling circuit, which comprises a pump (7). It may comprise, by way of example, a hydrocyclone treating the entire quantity of washing liquid, with an overflow feeding the scrubber (1) and an underflow feeding a filter producing solid residue (8) and a liquid discharge (9) containing the soluble and/or leached elements.

By means of a treatment plant (14) for this effluent it is possible to extract, e.g. the heavy metals (15) from a clear liquid (16) no longer containing these toxic elements. The treatment plant in this case has a lower capacity than those used in conventional solutions. The solid residue (8) may require additional treatment (12) prior to disposal or reutilization. One advantageous variant relates to plants for the combustion of solid fuels producing clinker. The solid residue (13) or (8) can then be reintroduced into this combustion plant in order to be fused into the clinker, the solid residue having been rid of easily volatilizable elements. It should be understood, moreover, that the preceding description is given merely by way of example, that it in no way limits the scope of the invention and that it is possible to replace the embodiments described by any other equivalent embodiments without going beyond the scope of the invention. Consequently, in so far as any changes, modifications or rearrangements of this kind are obvious to the person skilled in the art, they are deemed to be an integral part of this invention.

I claim:

1. Process for the purification of flue gases from which a quantity of flue dust has been recovered, in which the flue gases containing pollutants are thereafter purified by wet methods in a scrubber, with recycling of the washing liquid and discharge of the pollutants collected, characterised in that:
   a) an acidifying agent is added to the washing liquid,
   b) the flue dust recovered is introduced into the washing liquid emerging from the scrubber,
   c) a neutralizing agent is added to the washing liquid in such a quantity that the washing liquid remains acid and
   d) the washing liquid is passed into an apparatus for separating suspended particles, the overflow of which is feeding the scrubber with washing liquid and underflow of which comprises, on the one hand, solid residue, and, on the other hand, a liquid discharge containing solubilized elements.

2. Process according to claim 1, characterised in that the acidifying agent consists entirely or partly of the acid gases contained in the flue gases and absorbed by the washing liquid in the scrubber.

3. Process according to claim 1, charaacterised in that the neutralizing agent consists entirely or partly of the alkaline elements of the dust contained in the flue gases and recovered in the scrubber by the washing liquid.

4. Process according to claim 1, in which the flue gases are emitted by a plant for the combustion of solid fuels producing clinkers, characterised in that the treatment of the solid residue consists finally in injecting said residue into the combustion plant.

5. Process according to claim 1, characterised in that the liquid discharge emerging from the separating apparatus is subjected to treatment to separate the dissolved pollutants and the clear liquid.

* * * * *

UNITED STATES PATENT AND TRADEMARK OFFICE
CERTIFICATE OF CORRECTION

PATENT NO.   :   5,039,498
DATED        :   August 13, 1991
INVENTOR(S)  :   Jean-Francois Vicard It is certified that error appears in the above-identified patent and that said Letters Patent is hereby corrected as shown below:

Title page, item [75] Inventor: should read as follows:

[75] Inventor: Jean-Francois Vicard, Lyon, France --

Signed and Sealed this

Fourth Day of May, 1993

Attest:

MICHAEL K. KIRK

*Attesting Officer*   Acting Commissioner of Patents and Trademarks